US012237099B2

(12) United States Patent
Kobayashi

(10) Patent No.: US 12,237,099 B2
(45) Date of Patent: Feb. 25, 2025

(54) GROMMET

(71) Applicant: SUMITOMO WIRING SYSTEMS, LTD., Mie (JP)

(72) Inventor: Taiki Kobayashi, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 212 days.

(21) Appl. No.: 17/922,928

(22) PCT Filed: May 20, 2021

(86) PCT No.: PCT/JP2021/019253
§ 371 (c)(1),
(2) Date: Nov. 2, 2022

(87) PCT Pub. No.: WO2021/235531
PCT Pub. Date: Nov. 25, 2021

(65) Prior Publication Data
US 2023/0162893 A1    May 25, 2023

(30) Foreign Application Priority Data

May 22, 2020   (JP) ................................. 2020-090086

(51) Int. Cl.
*H01B 17/58* (2006.01)
*B60R 16/02* (2006.01)

(52) U.S. Cl.
CPC ........ *H01B 17/583* (2013.01); *B60R 16/0222* (2013.01)

(58) Field of Classification Search
CPC ........ H02G 3/04; H02G 15/013; H02G 3/088; H02G 3/046; H02G 3/22; H01B 17/583;
(Continued)

(56) References Cited

U.S. PATENT DOCUMENTS 6,211,464 B1 *   4/2001   Mochizuki .......... B60R 16/0222
                                                        174/659
6,267,385 B1 *   7/2001   Okamoto ................ B60R 16/02
                                                          16/2.1
(Continued)

FOREIGN PATENT DOCUMENTS

| JP | 2003-111249 A | 4/2003 |
| JP | 2011-193557 A | 9/2011 |
| JP | 2018-133962 A | 8/2018 |

OTHER PUBLICATIONS

International Search Report issued on Jul. 20, 2021 for WO 2021/235531 A1 (4 pages).

*Primary Examiner* — Angel R Estrada
(74) *Attorney, Agent, or Firm* — Venjuris, P.C.

(57) ABSTRACT

A grommet according to one aspect of the present disclosure includes: an annular mounting portion that is to be fixed to a surrounding portion of an insertion hole of a vehicle body panel; and a tubular stress-absorbing portion that includes a tubular side wall that extends from an inner circumferential rim portion of the mounting portion toward one side in an axial direction, and a bottom wall that partially closes off the tubular side wall at a front end of the tubular side wall. Furthermore, the grommet includes tubular insertion portions that are provided integrally with the bottom wall, and that cover the outer circumferences of wire harnesses inserted into the insertion hole. The mounting portion includes an annular seal portion that comes into close contact with the surrounding portion of the insertion hole of the vehicle body panel. The side wall is flexible.

6 Claims, 4 Drawing Sheets

(58) Field of Classification Search
CPC ........ H01B 17/30; H01B 17/58; H01B 17/00;
H01B 17/26; B60R 16/0222; B60R
16/0207; B60R 16/02; F16L 5/02
USPC .... 174/152 G, 153 G, 152 R, 135, 650, 142;
16/2.1, 2.2; 248/56
See application file for complete search history.

(56) References Cited

U.S. PATENT DOCUMENTS

| | | | | |
|---|---|---|---|---|
| 6,328,498 | B1 * | 12/2001 | Mersch | ................... F16D 3/845 |
| | | | | 277/636 |
| 6,525,269 | B2 * | 2/2003 | Sato | ......................... H02G 3/22 |
| | | | | 174/152 G |
| 8,108,968 | B2 * | 2/2012 | Pietryga | ............... H02G 3/0468 |
| | | | | 174/152 G |
| 8,502,079 | B2 * | 8/2013 | Shitamichi | .......... B60R 16/0222 |
| | | | | 174/152 G |
| 10,525,908 | B2 * | 1/2020 | Cimpean | ................... H02G 3/22 |
| 2004/0154819 | A1 | 8/2004 | Sakata | |
| 2016/0318464 | A1 | 11/2016 | Oohira | |

* cited by examiner

GROMMET

CROSS REFERENCE TO RELATED APPLICATIONS

This application is a national phase of PCT application No. PCT/JP2021/019253, filed on 20 May 2021, which claims priority from Japanese patent application No. 2020-090086, filed on 22 May 2020, all of which are incorporated herein by reference.

TECHNICAL FIELD

The present disclosure relates to a grommet.

BACKGROUND

Conventionally, there are cases in which a grommet is used to waterproof an insertion hole provided in a vehicle body panel when a wire harness is inserted into the insertion hole. Such a grommet includes an annular mounting portion that is to be fixed to a portion around the insertion hole of the vehicle body panel, and a tubular insertion portion that comes into contact with the outer circumferential surface of the wire harness and covers the outer circumference of the wire harness. Furthermore, the mounting portion includes an annular seal portion that comes into close contact with a surrounding portion of the insertion hole of the vehicle body panel or with the inner circumferential surface of the insertion hole.

For example, the grommet disclosed in Patent Document 1 includes a flexible portion that connects a mounting portion and an insertion portion so as to close off the space between the mounting portion and the insertion portion. The flexible portion is provided so as to extend to the inner circumferential rim portion of the mounting portion from one of two axial end portions of the insertion portion that is located on the vehicle-body-panel side when the grommet is mounted to a vehicle body panel. Furthermore, the flexible portion is formed from one pleat that has a shape resembling a mountain protruding toward the opposite side from the vehicle body panel in a state in which the grommet is mounted to the vehicle body panel.

PRIOR ART DOCUMENT

Patent Document

Patent Document 1: JP 2016-210214 A

SUMMARY OF THE INVENTION

Problems to be Solved

Incidentally, a wire harness may be inserted into an insertion hole in a state in which the wire harness is inclined with respect to the insertion hole. Furthermore, in a vehicle, there may be an error in the arrangement position of a wire harness. In such cases, the insertion portion of a grommet may be pulled strongly away from the mounting portion of the grommet in the axial direction of the mounting portion, or may be significantly inclined with respect to the mounting portion. In such situations, the mounting portion may also deform due to the connection portion not being able to absorb the stress caused by the change in posture and position of the insertion portion solely by itself. If the mounting portion deforms, a gap may form between the mounting portion and the vehicle body panel. If a gap is formed between the mounting portion and the vehicle body panel, water may enter via the gap, and thus there is a concern that the waterproofing performance of the grommet may decrease.

In view of this, in the grommet disclosed in Patent Document 1 for example, it is conceivable to increase the number of pleats in a flexible portion in order for the flexible portion to absorb large amounts of stress generated by the insertion portion moving relative to the mounting portion. However, if a configuration is adopted in which the flexible portion has a plurality of pleats that are arranged in a direction that is orthogonal to the center axis of the mounting portion, the size of the grommet would increase in the direction that is orthogonal to the center axis of the mounting portion. An increase in grommet size is not desirable because space for disposing a grommet in a vehicle is limited. Thus, there is a demand to suppress a decrease in the waterproofing performance of a grommet while suppressing an increase in the size of the grommet.

An object of the present disclosure is to provide a grommet with which a decrease in waterproofing performance can be suppressed while suppressing an increase in size.

Means to Solve the Problem

A grommet according to the present disclosure is a grommet including: an annular mounting portion that is to be fixed to a surrounding portion of an insertion hole of an object to which the grommet is to be attached and which includes the insertion hole; a tubular stress-absorbing portion that includes a tubular side wall that extends from an inner circumferential rim portion of the mounting portion toward one side in an axial direction of the mounting portion, and a bottom wall that partially closes off the tubular side wall at a front end of the tubular side wall; and a tubular insertion portion that is provided integrally with the bottom wall, and that comes into contact with an the outer circumferential surface of a wire harness inserted into the insertion hole and covers the outer circumference of the wire harness, wherein the mounting portion includes an annular seal portion that comes into close contact with the surrounding portion of the insertion hole of the object to which the grommet is to be attached, or with an inner circumferential surface of the insertion hole, the side wall is flexible, and the insertion portion protrudes inside the stress-absorbing portion from the bottom wall toward the base-end side of the side wall.

Effect of the Invention

According to the grommet according to the present disclosure, a decrease in waterproofing performance can be suppressed while suppressing an increase in size.

DETAILED DESCRIPTION TO EXECUTE THE INVENTION

[Description of Embodiments of Present Disclosure]

Figure 1:
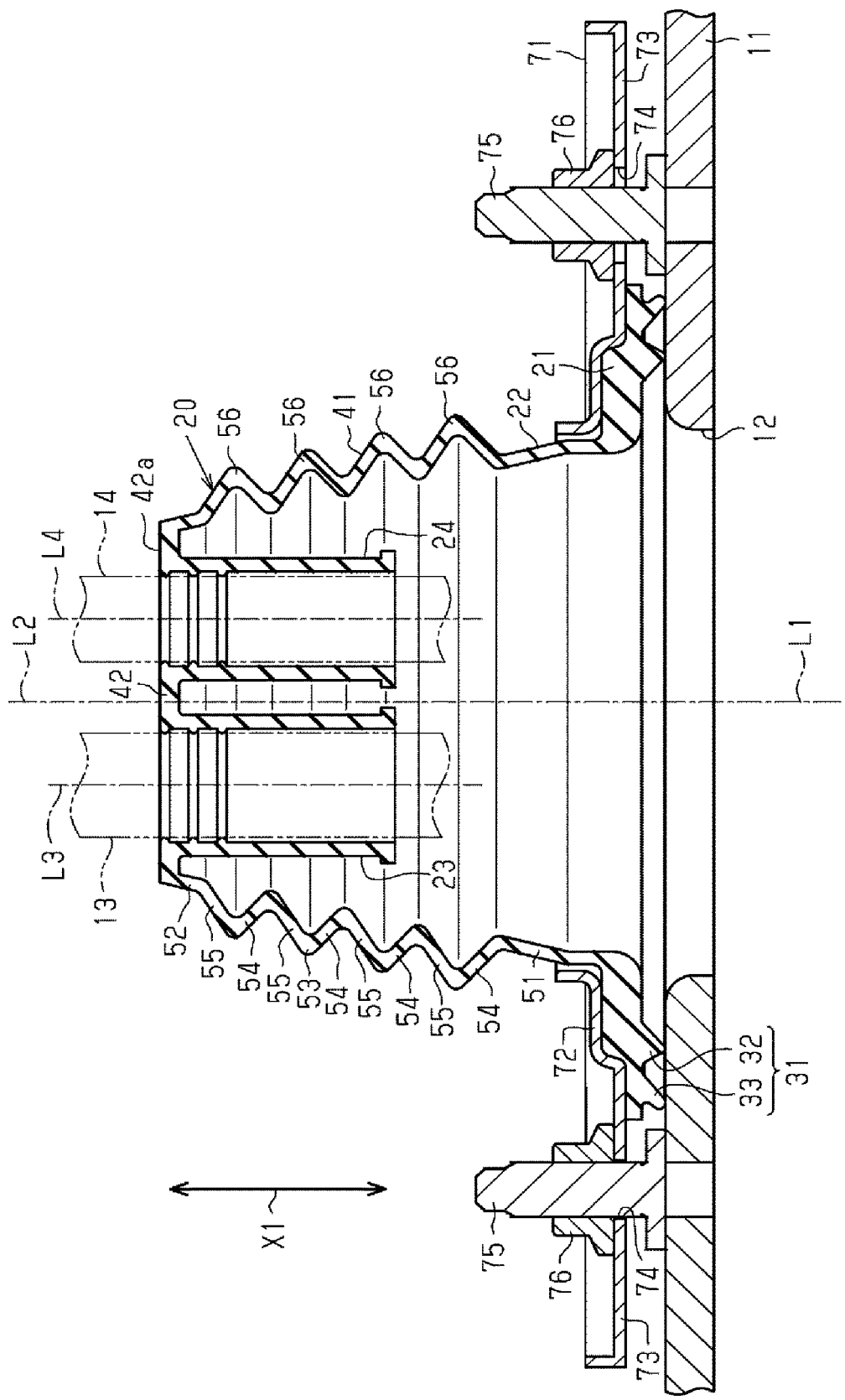
FIG. 1 is a cross-sectional view of a grommet mounted to a vehicle body panel in one embodiment.

First, aspects of the present disclosure will be listed and described.

[1] A grommet according to the present disclosure is a grommet including: an annular mounting portion that is to be fixed to a surrounding portion of an insertion hole of an object to which the grommet is to be attached and which includes the insertion hole; a tubular stress-absorbing portion that includes a tubular side wall that extends from an inner circumferential rim portion of the mounting portion toward one side in an axial direction of the mounting portion, and a bottom wall that partially closes off the tubular side wall at a front end of the tubular side wall; and a tubular insertion portion that is provided integrally with the bottom wall, and that comes into contact with an outer circumferential surface of a wire harness inserted into the insertion hole and covers the outer circumference of the wire harness, wherein the mounting portion includes an annular seal portion that comes into close contact with the surrounding portion of the insertion hole of the object to which the grommet is to be attached, or with an inner circumferential surface of the insertion hole, the side wall is flexible, and the insertion portion protrudes inside the stress-absorbing portion from the bottom wall toward the base-end side of the side wall.

According to this configuration, the insertion portion is provided integrally with the bottom wall of the stress-absorbing portion. Furthermore, the side wall of the stress-absorbing portion is flexible. Thus, if the insertion portion moves relative to the mounting portion due to an error in the arrangement position of the wire harness, a difference in lengths of wire harnesses, etc., the stress generated by the relative movement can be absorbed by the side wall bending. In this way, the stress that is generated by the insertion portion moving relative to the mounting portion is absorbed by the side wall, which extends from the inner circumferential rim portion of the mounting portion toward one side in the axial direction of the mounting portion. Accordingly, transmission, to the mounting portion, of the stress generated by the insertion portion moving relative to the mounting portion can be suppressed without an increase in the size of the grommet in a direction that is orthogonal to the axial direction of the mounting portion. Furthermore, because deformation of the mounting portion when the insertion portion moves relative to the mounting portion can be suppressed, deformation of the seal portion can be suppressed. Thus, a decrease in the waterproofing performance of the grommet can be suppressed while suppressing an increase in the size of the grommet.

In addition, the insertion portion is provided integrally with the bottom wall of the stress-absorbing portion. Furthermore, the insertion portion protrudes inside the stress-absorbing portion from the bottom wall toward the base-end side of the side wall. Thus, an increase in the size of the grommet in the axial direction of the side wall can be suppressed compared to a case in which the entire insertion portion protrudes to the outside of the stress-absorbing portion. Accordingly, an increase in the size of the grommet in the axial direction of the side wall can be suppressed even if the side wall extends from the inner circumferential rim portion of the mounting portion toward one side in the axial direction of the mounting portion.

[2] Preferably, the insertion portion has a portion that overlaps the side wall in a direction that is orthogonal to a center axis of the insertion portion in a cross-section taken along a plane including the center axis of the insertion portion.

According to this configuration, an insertion portion that protrudes toward the base-end side of the side wall inside the stress-absorbing portion can be easily provided.

[3] Preferably, the side wall includes a plurality of pleat portions that extend along a direction that intersects a center axis of the side wall when seen from a direction that is orthogonal to an axial direction of the side wall, and the plurality of pleat portions are displaced from one another in the axial direction of the side wall.

According to this configuration, the plurality of pleat portions are displaced from one another in the axial direction of the side wall. Thus, a plurality of pleat portions can be provided in the stress-absorbing portion while suppressing an increase in the size of the stress-absorbing portion in a direction that is orthogonal to the axial direction of the mounting portion compared to a case in which a plurality of pleat portions are arranged in the direction that is orthogonal to the axial direction of the mounting portion. Furthermore, the stress generated by the insertion portion moving relative to the mounting portion can be more readily absorbed by the side wall including the plurality of pleat portions due to the pleat portions deforming in an expanding or contracting fashion. Accordingly, because deformation of the mounting portion when the insertion portion moves relative to the mounting portion can be suppressed to a greater degree, deformation of the seal portion can be suppressed to a greater degree. Thus, a decrease in the waterproofing performance of the grommet can be suppressed to a greater degree.

[4] Preferably, the pleat portions each have an annular shape encircling the center axis of the side wall, and the plurality of pleat portions are arranged from the mounting-portion side toward the bottom-wall side and form a bellows portion in which adjacent ones of the pleat portions are continuously connected.

According to this configuration, the plurality of pleat portions in the side wall form a bellows portion. Thus, in addition to the plurality of pleat portions deforming in an expanding or contracting fashion, portions between adjacent pleat portions can also deform in an expanding or contracting fashion. Accordingly, the stress generated by the insertion portion moving relative to the mounting portion can be more readily absorbed by the side wall including the bellows portion. Hence, because deformation of the mounting portion when the insertion portion moves relative to the mounting portion can be suppressed to a greater degree, deformation of the seal portion can be suppressed to a greater degree. Thus, a decrease in the waterproofing performance of the grommet can be suppressed to a greater degree. Furthermore, because the side wall allows the insertion portion to move even more relative to the mounting portion, a decrease in the waterproofing performance of the grommet can be suppressed even more.

[5] Preferably, the entire insertion portion is positioned closer to the mounting portion than an outer surface of the bottom wall is in the axial direction of the mounting portion.

According to this configuration, an increase in the size of the grommet in the axial direction of the mounting portion can be more readily suppressed compared to a case in which the insertion portion has a portion that protrudes from the bottom wall to the outside of the stress-absorbing portion. Accordingly, an increase in the size of the grommet in the axial direction of the mounting portion can be suppressed more readily even if the side wall extends from the inner circumferential rim portion of the mounting portion toward one side in the axial direction of the mounting portion.

[Details of Embodiments of Present Disclosure]

Specific examples of the grommet according to the present disclosure will be described below with reference to the drawings. Note that the present disclosure is not limited to these examples, and is intended to include all modifications that are indicated by the claims and are within the meaning and scope of equivalents of the claims.

One embodiment of the grommet will be described below. Note that some components may be exaggerated or simplified in the attached drawings for the sake of description. Also, the dimensional ratio of some parts may differ from their actual ratio.

A grommet 20 according to the present embodiment illustrated in FIG. 1 is for waterproofing an insertion hole 12 that is formed in a vehicle body panel 11 that partitions the interior and the exterior of an automobile. Specifically, the grommet 20 is for ensuring waterproofness between the insertion hole 12 and wire harnesses 13 and 14 that are inserted into the insertion hole 12. Furthermore, the grommet 20 also fulfills the role of protecting the wire harnesses 13 and 14.

For example, the vehicle body panel 11 is a panel that partitions an underfloor space and an engine room of the vehicle. The insertion hole 12 extends through the vehicle body panel 11. In the present embodiment, the insertion hole 12 has a circular shape when seen from the direction in which the insertion hole 12 extends.

Configuration of Grommet 20

Figure 2:
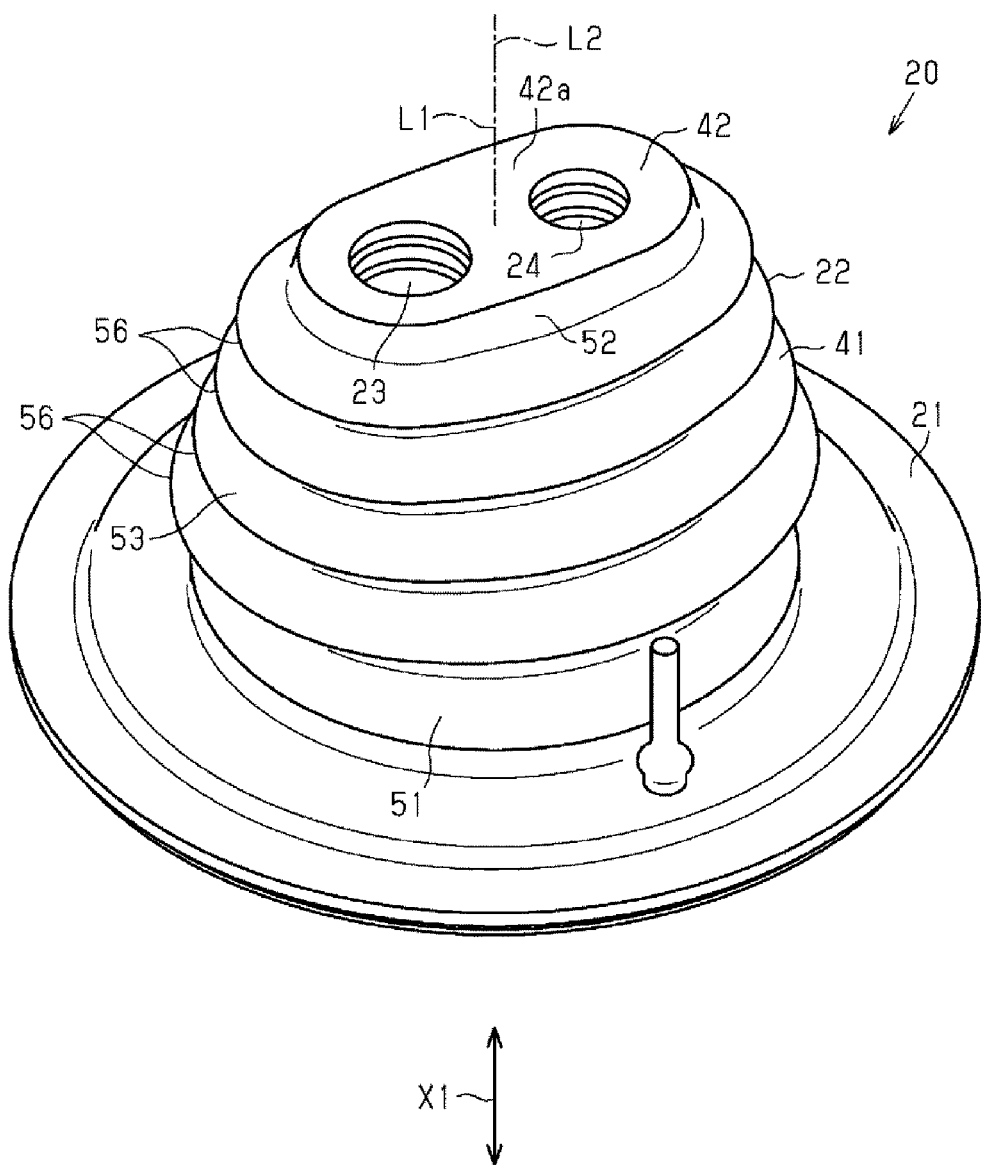
FIG. 2 is a perspective view of the grommet in one embodiment.

As illustrated in FIGS. 1 and 2, the grommet 20 includes an annular mounting portion 21 that is to be fixed to a surrounding portion of the insertion hole 12 of the vehicle body panel 11, and a stress-absorbing portion 22 that is provided integrally with the inner circumferential rim portion of the mounting portion 21. Furthermore, the grommet 20 includes a tubular first insertion portion 23 and a tubular second insertion portion 24 that respectively cover the outer-circumferential surfaces of the wire harness 13 and the wire harness 14 inserted into the insertion hole 12. The grommet 20 is made of a flexible material. For example, an elastomer, such as highly-flexible ethylene propylene diene monomer (EPDM) rubber, can be used as the material of the grommet 20.

Configuration of Mounting Portion 21

Figure 4:
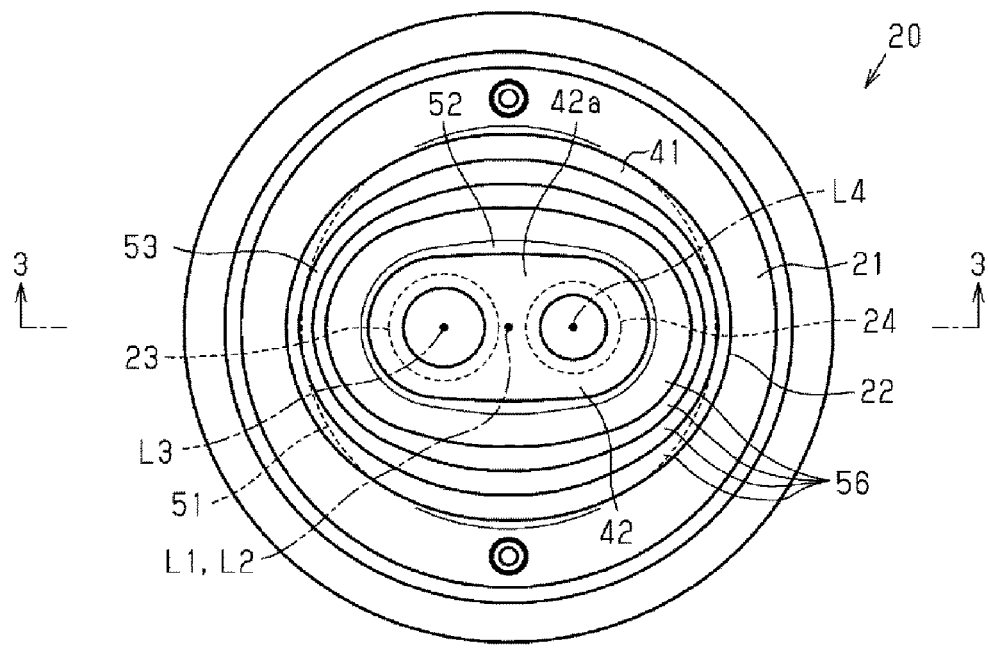
FIG. 4 is a plan view of the grommet in one embodiment.

As illustrated in FIGS. 1, 2, and 4, the mounting portion 21 has an annular shape with a circular outer shape. Note that, in the following, a direction that is parallel with a center axis L1 of the mounting portion 21, or in other words an axial direction of the mounting portion 21, is referred to as an axial direction X1. Furthermore, the term "radial direction" or "radially", when used independently, indicates a radial direction of the mounting portion 21 that is orthogonal to the center axis L1. Also, the term "circumferential direction", when used independently, indicates a circumferential direction of the mounting portion 21 about the center axis L1.

The inner circumferential rim portion of the mounting portion 21 has an oval shape that is concentric with the outer shape of the mounting portion 21 when seen from the axial direction X1. The outer diameter of the mounting portion 21 is larger than the inner diameter of the insertion hole 12. When the grommet 20 is mounted to the vehicle body panel 11, the mounting portion 21 faces a surrounding portion of the insertion hole 12 of the vehicle body panel 11.

Figure 3:
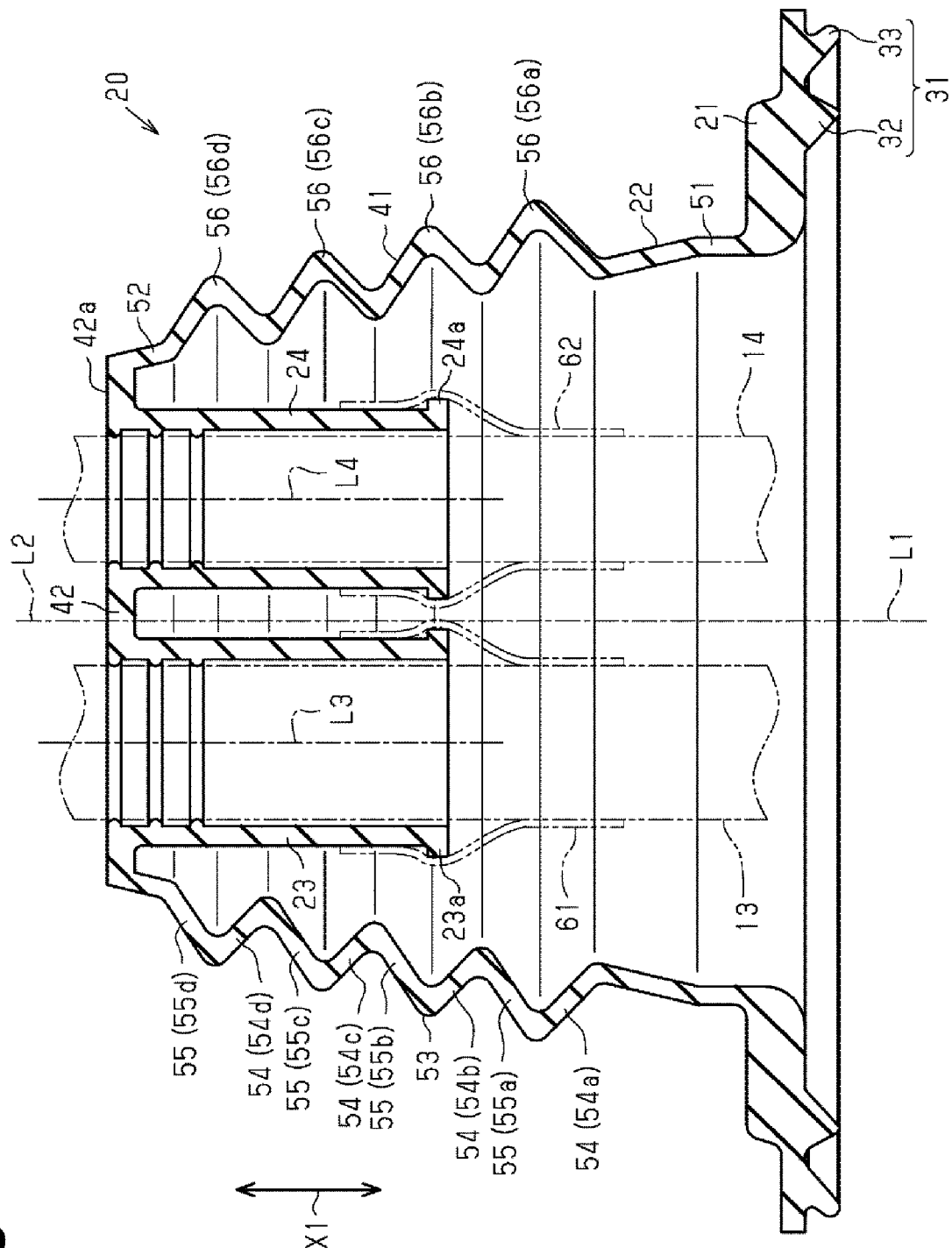
FIG. 3 is a cross-sectional view of the grommet in one embodiment.

As illustrated in FIGS. 1 and 3, the mounting portion 21 includes a seal portion 31 on one surface thereof in the axial direction X1. This surface is the surface of the mounting portion 21 that faces the vehicle body panel 11 in the axial direction X1 when the grommet 20 is mounted to the vehicle body panel 11. When the grommet 20 is mounted to the vehicle body panel 11, the seal portion 31 comes into close contact with the surrounding portion of the insertion hole 12 of the vehicle body panel 11. Note that FIG. 3 is a cross-sectional view taken along line 3-3 in FIG. 4.

The seal portion 31 includes a first lip portion 32 and a second lip portion 33. The first lip portion 32 and the second lip portion 33 each protrude in the axial direction X1 from the one surface of the mounting portion 21 facing the vehicle body panel 11 in the axial direction X1. Furthermore, the first lip portion 32 and the second lip portion 33 each form a protrusion that extends continuously along the circumferential direction. The first lip portion 32 has an annular shape that is slightly larger than the inner diameter of the insertion hole 12. The second lip portion 33 has an annular shape that is slightly larger than the first lip portion 32. In a cross-section of the grommet 20 taken along a plane including the center axis L1, the first lip portion 32 and the second lip portion 33 are arranged in the radial direction. Note that the cross-sectional views of the grommet 20 shown in FIGS. 1 and 3 are cross-sectional views of the grommet 20 taken along a plane including the center axis L1.

Configuration of Stress-Absorbing Portion 22

As illustrated in FIGS. 1 to 3, the stress-absorbing portion 22 has a tubular shape and includes a tubular side wall 41 that extends from the inner circumferential rim portion of the mounting portion 21 toward one side in the axial direction X1, and a bottom wall 42 that partially closes off the side wall 41 at the front end of the side wall 41. The side wall 41 and the bottom wall 42 are flexible.

The side wall 41 extends from the inner circumferential rim portion of the mounting portion 21 in the direction away from the vehicle body panel 11 when the grommet 20 is attached to the vehicle body panel 11, or in other words, in the opposite direction from the direction in which the first lip portion 32 and the second lip portion 33 protrude from the mounting portion 21. In the present embodiment, the side wall 41 is formed coaxially with the mounting portion 21. That is, a center axis L2 of the side wall 41 is positioned on the same straight line as the center axis L1 of the mounting portion 21. Thus, the axial direction of the side wall 41 is the same direction as the axial direction X1.

The side wall 41 includes a tubular first tubular portion 51 that extends along the axial direction X1 from the inner circumferential rim portion of the mounting portion 21, a second tubular portion 52 that is positioned on the opposite axial end portion of the side wall 41 from the first tubular portion 51, and a bellows portion 53 that is provided so as to connect the first tubular portion 51 and the second tubular portion 52. Note that the first tubular portion 51 and the second tubular portion 52 respectively form the base end portion and the front end portion of the side wall 41.

As illustrated in FIG. 4, when seen from the axial direction X1, the first tubular portion 51 is formed in a tubular shape that has an oval shape corresponding to the inner circumferential rim portion of the mounting portion 21. The second tubular portion 52 has a tubular shape whose outer shape is smaller than the outer shape of the first tubular portion 51. Thus, the outer shape of the end portion of the stress-absorbing portion 22 that is located on the bottom-wall-42 side is smaller than the outer shape of the end portion of the stress-absorbing portion 22 that is located on an opening side of the stress-absorbing portion 22. When seen from the axial direction X1, the second tubular portion 52 is positioned radially inward of the first tubular portion 51. The second tubular portion 52 is formed in a tubular shape having a rounded rectangular shape (in other words, the shape of a race track) when seen from the axial direction X1. Note that the first tubular portion 51 and the second tubular portion 52 are formed so as to be concentric when seen from the axial direction X1.

As illustrated in FIGS. 2 to 4, the bottom wall 42 closes off the end portion of the second tubular portion 52 on the opposite side from the bellows portion 53. The bottom wall 42 has the shape of a plate that is orthogonal to the axial direction X1. When seen from the axial direction X1, the bottom wall 42 has the shape of a rounded rectangle corresponding to the shape of the front end portion of the side wall 41.

The bellows portion 53 includes a plurality of first wall portions 54 that are inclined with respect to the center axis L2, and a plurality of second wall portions 55 that are inclined with respect to the center axis L2 at an angle that is different from that of the first wall portions 54. In the present embodiment, the bellows portion 53 includes four first wall portions 54 and also includes four second wall portions 55. The first wall portions 54 and the second wall portions 55 each have an annular shape encircling the center axis L2. In the present embodiment, the first wall portions 54 and the second wall portions 55 each have an oval shape or a rounded rectangular shape when seen from the axial direction X1. In a cross-section of the grommet 20 taken along a plane including the center axis L2, the first wall portions 54 and the second wall portions 55 are arranged alternately from the mounting-portion-21 side toward the bottom-wall-42 side. That is, the first wall portions 54 and the second wall portions 55 are arranged alternately along the direction of the center axis L2, or in other words, along the axial direction of the side wall 41.

Here, the four first wall portions 54 are referred to as first wall portions 54a, 54b, 54c, and 54d in order from the one positioned on the base-end side of the side wall 41. Furthermore, the four second wall portions 55 are referred to as second wall portions 55a, 55b, 55c, and 55d in order from the one positioned on the base-end side of the side wall 41. The four first wall portions 54 and the four second wall portions 55 are arranged from the base-end side toward the front-end side of the side wall 41 in the order of the first wall portion 54a, the second wall portion 55a, the first wall portion 54b, the second wall portion 55b, the first wall portion 54c, the second wall portion 55c, the first wall portion 54d, and the second wall portion 55d. The first wall portion 54a extends from the end portion of the first tubular portion 51 on the opposite side from the mounting portion 21 in the axial direction X1. Furthermore, the second wall portion 55d extends from the end portion of the second tubular portion 52 on the opposite side from the bottom wall 42 in the axial direction X1.

The first wall portions 54a to 54d are each inclined with respect to the center axis L2 so that the diameter thereof increases as they approach the bottom wall 42 along the axial direction of the side wall 41 (the same direction as the axial direction X1 in the present embodiment). On the other hand, the second wall portions 55a to 55d are each inclined with respect to the center axis L2 so that the diameter thereof decreases as they approach the bottom wall 42 along the axial direction of the side wall 41. In this way, the first wall portions 54 and the second wall portions 55 are inclined in opposite directions. Furthermore, in regard to a first wall portion 54 and a second wall portion 55 that are adjacent to one another in the axial direction of the side wall 41, an end portion of the first wall portion 54 on one side in the axial direction of the side wall 41 and an end portion of the second wall portion 55 on the other side in the axial direction of the side wall 41 are connected to one another.

A first wall portion 54 and a second wall portion 55 that are adjacent to one another in the axial direction of the side wall 41 form a pleat portion 56 that extends along a direction that intersects the center axis L2 when seen from a direction that is orthogonal to the axial direction of the side wall 41. Specifically, a pleat portion 56a is formed by the first wall portion 54a positioned closest to the mounting portion 21 and the second wall portion 55a, which is positioned between the first wall portion 54a and the bottom wall 42 and is adjacent to the first wall portion 54a in the axial direction of the side wall 41. The first wall portion 54a and the second wall portion 55a form an annular groove that is open toward the inside of the side wall 41, and also form an annular protrusion that protrudes toward the outside of the side wall 41. Thus, the pleat portion 56a has a shape in which a groove that extends in the same direction as the protrusion is included behind the protrusion. Note that, in the present embodiment, the pleat portion 56a extends in a direction that is orthogonal to the center axis L2 when seen from a direction that is orthogonal to the axial direction of the side wall 41. Furthermore, in the present embodiment, a cross-section of the pleat portion 56a taken along a plane including the center axis L2, or in other words, a cross-section of the pleat portion 56a taken along a plane that is orthogonal to the circumferential direction, has a V-shape. Furthermore, the pleat portion 56a extends continuously without any breaks so as to encircle the center axis L2, and has an oval shape when seen from the axial direction of the side wall 41. That is, the pleat portion 56a has an annular shape encircling the center axis L2.

Similarly, the first wall portion 54b and the second wall portion 55b adjacent to one another in the axial direction of the side wall 41 form a pleat portion 56b that is similar to the pleat portion 56a. Also, the first wall portion 54c and the second wall portion 55c adjacent to one another in the axial direction of the side wall 41 form a pleat portion 56c that is similar to the pleat portion 56a. In addition, the first wall portion 54d and the second wall portion 55d adjacent to one another in the axial direction of the side wall 41 form a pleat portion 56d that is similar to the pleat portion 56a. Furthermore, the pleat portion 56a, the pleat portion 56b, the pleat portion 56c, and the pleat portion 56d are arranged in this order from the mounting-portion-21 side toward the bottom-wall-42 side. The pleat portions 56a to 56d are displaced from one another in the axial direction of the side wall 41.

Furthermore, because ends, in the axial direction X1, of the second wall portion 55a and the first wall portion 54b adjacent to one another in the axial direction of the side wall 41 are connected to one another, the pleat portion 56a and the pleat portion 56b adjacent to one another in the axial direction of the side wall 41 are provided so as to be continuous. Similarly, because ends, in the axial direction X1, of the second wall portion 55b and the first wall portion 54c adjacent to one another in the axial direction of the side wall 41 are connected to one another, the pleat portion 56b and the pleat portion 56c adjacent to one another in the axial direction of the side wall 41 are provided so as to be continuous. Also, because ends, in the axial direction X1, of the second wall portion 55c and the first wall portion 54d adjacent to one another in the axial direction of the side wall 41 are connected to one another, the pleat portion 56c and the pleat portion 56d adjacent to one another in the axial direction of the side wall 41 are provided so as to be continuous. Furthermore, the bellows portion 53, in which adjacent pleat portions 56 are continuously connected, is formed by these pleat portions 56*a* to 56*d*.

Among the plurality of pleat portions 56, the closer a pleat portion 56 is to the bottom wall 42 in a cross-section of the grommet 20 taken along a plane including the center axis L2, the shorter the length of the pleat portion 56 in a direction that is orthogonal to the center axis L2 is. Note that the length of a pleat portion 56 in a direction that is orthogonal to the center axis L2 in a cross-section of the grommet 20 taken along a plane including the center axis L2 corresponds to the left-right direction length of the pleat portion 56 in FIG. 3.

Configuration of Insertion Portions 23 and 24

As illustrated in FIG. 1, the first insertion portion 23 and the second insertion portion 24 are provided integrally with the bottom wall 42. When seen from the axial direction of the side wall 41, the first insertion portion 23 and the second insertion portion 24 are arranged in the longitudinal direction of the bottom wall 42. The first insertion portion 23 and the second insertion portion 24 each have a cylindrical shape extending along the axial direction of the side wall 41. In the present embodiment, the first insertion portion 23 and the second insertion portion 24 each have a cylindrical shape extending along the axial direction X1. In addition, the first insertion portion 23 and the second insertion portion 24 each protrude inside the stress-absorbing portion 22 from the bottom wall 42 toward the base-end portion side of the side wall 41. Furthermore, in a cross-section of the grommet 20 taken along a plane including a center axis L3 of the first insertion portion 23, the first insertion portion 23 overlaps the side wall 41 in a direction that is orthogonal to the center axis L3. In a cross-section of the grommet 20 taken along a plane including a center axis L4 of the second insertion portion 24, the second insertion portion 24 overlaps the side wall 41 in a direction that is orthogonal to the center axis L4. Note that the cross-sections of the grommet 20 illustrated in FIGS. 1 and 3 are cross-sections that are taken along a plane including the center axis L3 and are also cross-sections that are taken along a plane including the center axis L4. The entire first insertion portion 23 is positioned closer to the mounting portion 21 than an outer surface 42*a* of the bottom wall 42 is in the axial direction X1. The entire second insertion portion 24 is positioned closer to the mounting portion 21 than the outer surface 42*a* of the bottom wall 42 is in the axial direction X1.

The first insertion portion 23 comes into contact with the outer circumferential surface of the wire harness 13 inserted into the first insertion portion 23 and covers the outer circumference of the wire harness 13. Furthermore, the second insertion portion 24 comes into contact with the outer circumferential surface of the wire harness 14 inserted into the second insertion portion 24 and covers the outer circumference of the wire harness 14.

As illustrated in FIG. 3, a flange portion 23*a* that protrudes from the outer circumference of the first insertion portion 23 is provided at the front end portion of the first insertion portion 23, or more specifically, the front end portion of the portion of the first insertion portion 23 protruding inside the stress-absorbing portion 22. The flange portion 23*a* forms a protrusion that extends along the circumferential direction about the center axis L3. Similarly, a flange portion 24*a* that protrudes from the outer circumference of the second insertion portion 24 is provided at the front end portion of the second insertion portion 24, or more specifically, the front end portion of the portion of the second insertion portion 24 protruding inside the stress-absorbing portion 22. The flange portion 24*a* forms a protrusion that extends along the circumferential direction about the center axis L4. In the present embodiment, the flange portions 23*a* and 24*a* are toric in shape.

A fixing member 61 suppresses relative movement between the first insertion portion 23 and the wire harness 13 inserted into the first insertion portion 23, in the center axis L3 direction. For example, the fixing member 61 is a piece of adhesive tape that is wrapped around the outer circumferential surfaces of the first insertion portion 23 and the wire harness 13, a zip tie that is attached to the outer circumferential surface of the first insertion portion 23, or the like. In the present embodiment, the fixing member 61 is a piece of adhesive tape. When attaching the fixing member 61 to the first insertion portion 23 and the wire harness 13, the first insertion portion 23 is moved toward the opening of the stress-absorbing portion 22 as a result of being pulled toward the mounting portion 21. At this time, the first insertion portion 23 can be easily moved toward the opening of the stress-absorbing portion 22 due to bending of the side wall 41. In this state, the fixing member 61 is attached to the first insertion portion 23 and the wire harness 13. Note that, when the wrapping of the fixing member 61, which is a piece of adhesive tape, around the first insertion portion 23 is begun, the flange portion 23*a* is used to position an end portion of the fixing member 61 relative to the first insertion portion 23 in the center axis L3 direction.

A fixing member 62 similar to the fixing member 61 suppresses relative movement between the second insertion portion 24 and the wire harness 14 inserted into the second insertion portion 24, in the center axis L4 direction. The fixing member 62 is attached to the second insertion portion 24 and the wire harness 14 in the same manner as the fixing member 61 is attached to the first insertion portion 23 and the wire harness 13. Furthermore, when the wrapping of the fixing member 62, which is a piece of adhesive tape, around the second insertion portion 24 is begun, the flange portion 24*a* is used to position an end portion of the fixing member 62 relative to the second insertion portion 24 in the center axis L4 direction.

Configuration of Bracket 71

As illustrated in FIG. 1, the grommet 20 is attached to the vehicle body panel 11 using a bracket 71 that is to be fixed to the vehicle body panel 11. The bracket 71 is made using a metal plate member. The bracket 71 includes an annular sandwiching portion 72 and fixing portions 73 that are provided integrally with the sandwiching portion 72 in the outer circumferential rim of the sandwiching portion 72.

The outer diameter of the sandwiching portion 72 is larger than the inner diameter of the insertion hole 12. The fixing portions 73 are provided in the outer circumferential rim portion of the sandwiching portion 72 at a plurality of positions that are separated from one another in the circumferential direction of the sandwiching portion 72. In the present embodiment, the fixing portions 73 are provided at two positions in the outer circumferential rim portion of the sandwiching portion 72. Furthermore, the two fixing portions 73 are separated from one another by 180° in the circumferential direction of the sandwiching portion 72. Each fixing portion 73 is provided with a fixing hole 74 that extends through the fixing portion 73.

Attachment of Grommet 20 to Vehicle Body Panel 11

Two bolts 75 (i.e., a same number of bolts 75 as the number of fixing portions 73) on the vehicle body panel 11 are fixed to the surrounding portion of the insertion hole 12. The head portions of the bolts 75 are fixed to the vehicle body panel 11 through welding or the like. The two bolts 75 are separated from one another by 180° in the circumferential direction of the insertion hole 12.

When attaching the grommet 20 to the vehicle body panel 11, first, the grommet 20 is positioned relative to the vehicle body panel 11. The grommet 20 is positioned so that the mounting portion 21 faces the surrounding portion of the insertion hole 12 of the vehicle body panel 11 in the axial direction X1. At this time, the seal portion 31 comes into contact with the surrounding portion of the insertion hole 12 of the vehicle body panel 11. Next, the bracket 71 is positioned relative to the vehicle body panel 11. The bracket 71 is positioned relative to the vehicle body panel 11 in a manner such that the stress-absorbing portion 22 is inserted into the sandwiching portion 72 from the bottom-wall-42 side, and the bolts 75 are inserted into the fixing holes 74. Accordingly, the mounting portion 21 is positioned between the sandwiching portion 72 and the surrounding portion of the insertion hole 12 of the vehicle body panel 11.

Then, the bracket 71 is fixed to the vehicle body panel 11 by screwing nuts 76 onto the bolts 75. Thus, the grommet 20 is attached to the vehicle body panel 11. When the nuts 76 are fastened, the mounting portion 21 is sandwiched between the sandwiching portion 72 and the surrounding portion of the insertion hole 12 of the vehicle body panel 11. Furthermore, the nuts 76 are tightened until the first lip portion 32 and the second lip portion 33 come into liquid-tight close contact with the surrounding portion of the insertion hole 12 of the vehicle body panel 11. Note that FIG. 1 illustrates a state in which the nuts 76 have been tightened to a point immediately before the first lip portion 32 and the second lip portion 33 are pressed against the vehicle body panel 11.

The operation of the present embodiment will be described.

Infiltration of liquids such as water from between the grommet 20 and the surrounding portion of the insertion hole 12 of the vehicle body panel 11 is suppressed by the first lip portion 32 and the second lip portion 33 that are in close contact with the surrounding portion of the insertion hole 12 of the vehicle body panel 11.

If the first insertion portion 23 and the second insertion portion 24 move relative to the mounting portion 21 due to displacement or the like of the wire harnesses 13 and 14 relative to the vehicle body as illustrated in FIGS. 1 and 3, the stress generated by the movement of the first insertion portion 23 and the second insertion portion 24 relative to the mounting portion 21 can be absorbed by the side wall 41 due to the side wall 41 bending. In the present embodiment, the stress generated by the insertion portions 23 and 24 moving relative to the mounting portion 21 can be absorbed by the bellows portion 53 as a result of the degree of expansion of each pleat portion 56 changing, or in other words, as a result of the angle formed by a first wall portion 54 and a second wall portion 55 that are adjacent to one another changing.

For example, if the insertion portions 23 and 24 move relatively closer to the mounting portion 21 in the axial direction X1, the bellows portion 53 deforms such that the pleat portions 56 contract, or in order words, such that the angle formed by a first wall portion 54 and a second wall portion 55 that are adjacent to one another decreases. Thus, the stress generated by the insertion portions 23 and 24 moving relative to the mounting portion 21 in the axial direction X1 can be absorbed by the bellows portion 53. Therefore, deformation of the mounting portion 21, which is connected to the end portion of the side wall 41 on the opposite side from the insertion portions 23 and 24, is suppressed. Furthermore, the bellows portion 53 allows the insertion portions 23 and 24 to move relative to the mounting portion 21 in the axial direction X1. Note that, if the insertion portions 23 and 24 move relatively away from the mounting portion 21 in the axial direction X1, the stress generated by the relative movement can be absorbed by the bellows portion 53 as a result of the bellows portion 53 deforming such that the pleat portions 56 expand, or in order words, such that the angle formed by a first wall portion 54 and a second wall portion 55 that are adjacent to one another increases.

Furthermore, for example, if the wire harnesses 13 and 14 are inclined with respect to the axial direction X1, or in other words, if the insertion portions 23 and 24 are inclined with respect to the axial direction X1, the bellows portion 53 deforms as a result of the degree of expansion of each pleat portion 56 changing, or in order words, the bellows portion 53 deforms such that the angle formed by a first wall portion 54 and a second wall portion 55 that are adjacent to one another changes. Thus, the stress generated by the insertion portions 23 and 24 being inclined with respect to the axial direction X1 can be absorbed by the bellows portion 53. Thus, deformation of the mounting portion 21 is suppressed. Furthermore, the bellows portion 53 allows the insertion portions 23 and 24 to be inclined with respect to the axial direction X1.

The effects of the present embodiment will be described.

(1) The grommet 20 includes an annular mounting portion 21 that is to be fixed to a surrounding portion of an insertion hole 12 of a vehicle body panel 11 that includes the insertion hole 12. In addition, the grommet 20 includes a tubular stress-absorbing portion 22 that includes a tubular side wall 41 that extends from an inner circumferential rim portion of the mounting portion 21 toward one side in an axial direction X1, and a bottom wall 42 that partially closes off the side wall 41 at a front end of the side wall 41. Furthermore, the grommet 20 includes a tubular first insertion portion 23 that is provided integrally with the bottom wall 42, and that comes into contact with an outer circumferential surface of a wire harness 13 inserted into the insertion hole 12 and covers the outer circumference of the wire harness 13. In addition, the grommet 20 includes a tubular second insertion portion 24 that is provided integrally with the bottom wall 42, and that comes into contact with an outer circumferential surface of a wire harness 14 inserted into the insertion hole 12 and covers the outer circumference of the wire harness 14. The mounting portion 21 includes an annular seal portion 31 that comes into close contact with the surrounding portion of the insertion hole 12 of the vehicle body panel 11. The side wall 41 is flexible. The first insertion portion 23 protrudes inside the stress-absorbing portion 22 from the bottom wall 42 toward the base-end side of the side wall 41. The second insertion portion 24 protrudes inside the stress-absorbing portion 22 from the bottom wall 42 toward the base-end side of the side wall 41.

According to this configuration, the insertion portions 23 and 24 are provided integrally with the bottom wall 42 of the stress-absorbing portion 22. Furthermore, the side wall 41 of the stress-absorbing portion 22 is flexible. Thus, if the insertion portions 23 and 24 move relative to the mounting portion 21 due to an error in the arrangement position of the wire harnesses 13 and 14 with respect to the vehicle body, a difference in the lengths of the wire harnesses 13 and 14, etc., the stress generated by relative movement can be absorbed as a result of the side wall 41 bending. In this way, the stress that is generated by the insertion portions 23 and 24 moving relative to the mounting portion 21 is absorbed by the side wall 41, which extends from the inner circumferential rim portion of the mounting portion 21 toward one side in the axial direction X1. Accordingly, transmission, to the mounting portion 21, of the stress generated by the insertion portions 23 and 24 moving relative to the mounting portion 21 can be suppressed without an increase in the size of the grommet 20 in a direction that is orthogonal to the axial direction X1. Furthermore, because deformation of the mounting portion 21 when the insertion portions 23 and 24 move relative to the mounting portion 21 can be suppressed, deformation of the seal portion 31 can be suppressed. Thus, a decrease in the waterproofing performance of the grommet 20 can be suppressed while suppressing an increase in the size of the grommet 20.

In addition, the insertion portions 23 and 24 are provided integrally with the bottom wall 42 of the stress-absorbing portion 22. Furthermore, the first insertion portion 23 protrudes inside the stress-absorbing portion 22 from the bottom wall 42 toward the base-end side of the side wall 41. Similarly, the second insertion portion 24 protrudes inside the stress-absorbing portion 22 from the bottom wall 42 toward the base-end side of the side wall 41. Thus, an increase in the size of the grommet 20 in the axial direction of the side wall 41 can be suppressed compared to a case in which the insertion portions 23 and 24 protrude in their entirety to the outside of the stress-absorbing portion 22. Accordingly, an increase in the size of the grommet 20 in the axial direction of the side wall 41 can be suppressed even if the side wall 41 extends from the inner circumferential rim portion of the mounting portion 21 toward one side in the axial direction X1.

(2) In a cross-section of the grommet 20 taken along a plane including a center axis L3 of the first insertion portion 23, the first insertion portion 23 overlaps the side wall 41 in a direction that is orthogonal to the center axis L3. Furthermore, in a cross-section of the grommet 20 taken along a plane including a center axis L4 of the second insertion portion 24, the second insertion portion 24 overlaps the side wall 41 in a direction that is orthogonal to the center axis L4. By adopting this configuration, the insertion portions 23 and 24 protruding toward the base-end side of the side wall 41 inside the stress-absorbing portion 22 can be easily provided.

(3) The side wall 41 includes a plurality of pleat portions 56 that extend along a direction that intersects a center axis L2 of the side wall 41 when seen from a direction that is orthogonal to an axial direction of the side wall. The plurality of pleat portions 56 are displaced from one another in the axial direction of the side wall 41.

According to this configuration, the plurality of pleat portions 56 are displaced from one another in the axial direction of the side wall 41. Thus, the plurality of pleat portions 56 can be provided in the stress-absorbing portion 22 while suppressing an increase in the size of the stress-absorbing portion 22 in a direction that is orthogonal to the axial direction X1 compared to a case in which a plurality of pleat portions are arranged in the direction that is orthogonal to the axial direction X1. Furthermore, the stress generated by the insertion portions 23 and 24 moving relative to the mounting portion 21 can be more readily absorbed by the side wall 41 including the plurality of pleat portions 56 due to the pleat portions 56 deforming in an expanding or contracting fashion. Accordingly, because deformation of the mounting portion 21 when the insertion portions 23 and 24 move relative to the mounting portion 21 can be suppressed to a greater degree, deformation of the seal portion 31 can be suppressed to a greater degree. Thus, a decrease in the waterproofing performance of the grommet 20 can be suppressed to a greater degree.

(4) The pleat portions 56 each have an annular shape encircling the center axis L2 of the side wall 41. The plurality of pleat portions 56 are arranged from the mounting-portion-21 side toward the bottom-wall-42 side and form a bellows portion 53 in which adjacent ones of the pleat portions 56 are continuously connected.

According to this configuration, the plurality of pleat portions 56 in the side wall 41 form the bellows portion 53. Thus, in addition to the plurality of pleat portions 56 deforming in an expanding or contracting fashion, portions between adjacent pleat portions 56 can also deform in an expanding or contracting fashion. Accordingly, the stress generated by the insertion portions 23 and 24 moving relative to the mounting portion 21 can be more readily absorbed by the side wall 41 including the bellows portion 53. Hence, because deformation of the mounting portion 21 when the insertion portions 23 and 24 move relative to the mounting portion 21 can be suppressed to a greater degree, deformation of the seal portion 31 can be suppressed to a greater degree. Thus, a decrease in the waterproofing performance of the grommet 20 can be suppressed to a greater degree. Furthermore, because the side wall 41 allows the insertion portions 23 and 24 to move even more relative to the mounting portion 21, a decrease in the waterproofing performance of the grommet 20 can be suppressed even more.

(5) The insertion portions 23 and 24 are positioned in their entirety closer to the mounting portion 21 than an outer surface 42a of the bottom wall 42 is in the axial direction X1.

According to this configuration, an increase in the size of the grommet 20 in the axial direction X1 can be more readily suppressed compared to a case in which the insertion portions 23 and 24 have portions that protrude from the bottom wall 42 to the outside of the stress-absorbing portion 22. Accordingly, an increase in the size of the grommet 20 in the axial direction X1 can be suppressed more readily even if the side wall 41 extends from the inner circumferential rim portion of the mounting portion 21 toward one side in the axial direction X1.

(6) The outer shape of the end portion of the stress-absorbing portion 22 that is located on the bottom-wall-42 side is smaller than the outer shape of the end portion of the stress-absorbing portion 22 that is located on an opening side of the stress-absorbing portion 22. Thus, the size of the stress-absorbing portion 22 in a direction that is orthogonal to the center axis L2 can be reduced near the bottom wall 42. Moreover, the size of the grommet 20 in the direction that is orthogonal to the center axis L2 can be reduced. Furthermore, in the present embodiment, it is easier to insert the stress-absorbing portion 22 into the sandwiching portion 72 when attaching the grommet 20 to the vehicle body panel 11.

(7) The grommet 20 includes a plurality of insertion portions 23 and 24. Generally speaking, if the grommet 20 is provided with a plurality of insertion portions 23 and 24, the portions between the mounting portion 21 and the insertion portions 23 and 24 when seen from the axial directions of the insertion portions 23 and 24 tend to become narrower. Even in such a case, by adopting the configuration according to the present embodiment, a decrease in the waterproofing performance of the grommet 20 can be suppressed while suppressing an increase in the size of the grommet 20 in a direction that is orthogonal to the axial direction X1.

(8) The mounting portion 21 faces the surrounding portion of the insertion hole 12 of the vehicle body panel 11, and is sandwiched between the vehicle body panel 11 and a bracket 71 that is to be fixed to the vehicle body panel 11. In other words, the grommet 20 according to the present embodiment is mounted to the vehicle body panel 11 using the bracket 71. In the grommet 20 characterized as such, a decrease in the waterproofing performance of the grommet 20 can be suppressed while suppressing an increase in the size of the grommet 20.

The present embodiment may be modified as described below upon implementation. The present embodiment and the modifications below can be implemented in combination with one another as long as there no technical contradiction arises therebetween.

In the above-described embodiment, the grommet 20 is mounted to the vehicle body panel 11 using the bracket 71. However, the grommet 20 may be mounted to the vehicle body panel 11 without using the bracket 71. In this case, the mounting portion 21 includes an annular mounting groove that is open radially outward in the outer circumferential surface of the mounting portion 21. Furthermore, the grommet 20 including the mounting groove is mounted to the vehicle body panel 11 by pressing the mounting portion 21 into the insertion hole 12 such that the surrounding portion of the insertion hole 12 of the vehicle body panel 11 is inserted into the mounting groove. In this grommet 20, the bottom surface of the mounting groove corresponds to an annular seal portion that comes into close contact with the inner circumferential surface of the insertion hole 12.

In the above-described embodiment, the grommet 20 includes two insertion portions, namely the first insertion portion 23 and the second insertion portion 24. However, the number of insertion portions in the grommet 20 is not limited to this. For example, the grommet 20 may include only one insertion portion. Alternatively, for example, the grommet 20 may include three or more insertion portions.

The outer shape of the end portion of the stress-absorbing portion 22 that is located on the bottom-wall-42 side may have the same size as the outer shape of the end portion of the stress-absorbing portion 22 that is located on the opening side of the stress-absorbing portion 22.

In the above-described embodiment, the insertion portions 23 and 24 are positioned in their entirety closer to the mounting portion 21 than the outer surface 42a of the bottom wall 42 is in the axial direction X1. However, the position of the insertion portions 23 and 24 in the axial direction X1 is not limited to this. It is sufficient that the first insertion portion 23 protrudes inside the stress-absorbing portion 22 from the bottom wall 42 toward the base-end side of the side wall 41. In other words, it is sufficient that the first insertion portion 23 includes a portion that protrudes from the bottom wall 42 toward the base-end side of the side wall 41 and that is positioned inside the stress-absorbing portion 22. In this case, the first insertion portion 23 preferably includes a portion that overlaps the side wall 41 in a direction that is orthogonal to the center axis L3 in a cross-section taken along a plane including the center axis L3. Furthermore, it is sufficient that the second insertion portion 24 protrudes inside the stress-absorbing portion 22 from the bottom wall 42 toward the base-end side of the side wall 41. In other words, it is sufficient that the second insertion portion 24 includes a portion that protrudes from the bottom wall 42 toward the base-end side of the side wall 41 and that is positioned inside the stress-absorbing portion 22. In this case, the second insertion portion 24 preferably includes a portion that overlaps the side wall 41 in a direction that is orthogonal to the center axis L4 in a cross-section taken along a plane including the center axis L4. In any case, the portion of the first insertion portion 23 to which the fixing member 61 is to be attached and the portion of the second insertion portion 24 to which the fixing member 62 is to be attached are positioned closer to the mounting portion 21 than the outer surface 42a of the bottom wall 42 is in the axial direction X1. For example, the insertion portions 23 and 24 may include portions protruding from the outer surface 42a of the bottom wall 42.

The number of pleat portions 56 forming the bellows portion 53 is not limited to four, and it is sufficient that a plurality of pleat portions 56 form the bellows portion 53.

In the above-described embodiment, the plurality of pleat portions 56 form the bellows portion 53 by adjacent ones of the pleat portions 56 being continuously connected. However, the plurality of pleat portions 56 do not necessarily need to form the bellows portion 53. For example, pleat portions 56 that are adjacent to one another in the axial direction of the side wall 41 may be connected by a tubular portion that is a part of the side wall 41 and that extends in the axial direction X1 but does not have the shape of a pleat.

As long as the side wall 41 has a tubular shape that extends from the inner circumferential rim portion of the mounting portion 21 toward one side in the axial direction X1, the shape of the side wall 41 is not limited to that in the above-described embodiment. For example, the side wall 41 may have a tubular shape that has a circular shape, a polygonal shape, etc., when seen from the axial direction of the side wall 41. Also, for example, the side wall 41 may be formed from one tubular wall that does not have any bumps or dips between the mounting portion 21 and the bottom wall 42.

Figure 5:
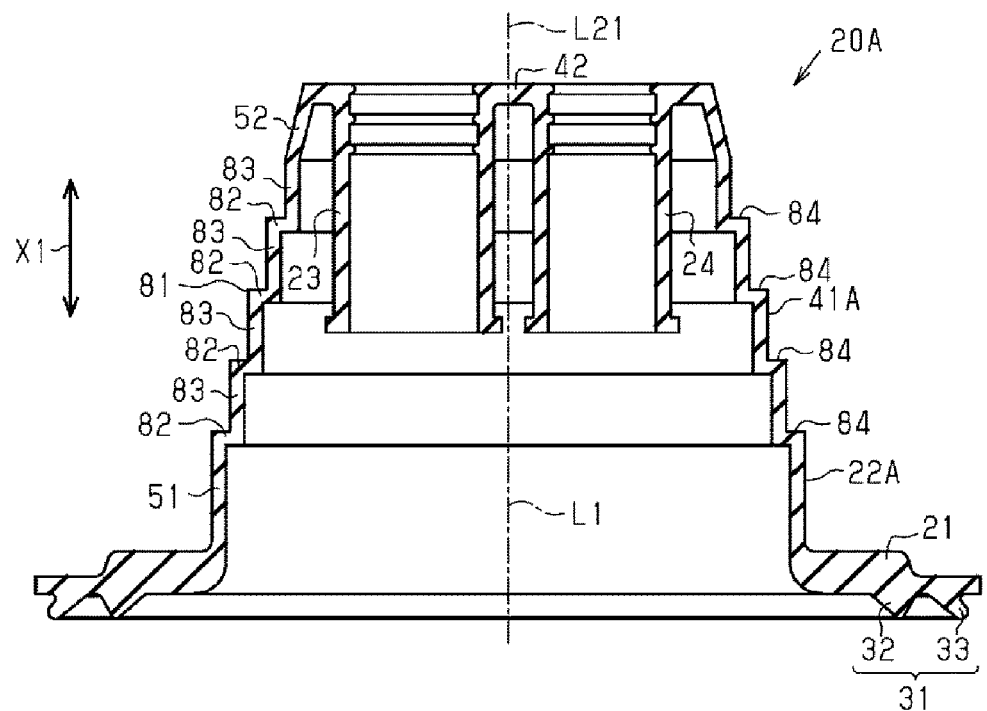
FIG. 5 is a cross-sectional view of a grommet in a modification.

Furthermore, for example, a stress-absorbing portion 22A of a grommet 20A illustrated in FIG. 5 includes a side wall 41A that includes a staircase portion 81 that has the shape of a staircase. Note that, in FIG. 5, the same reference symbols are given to configurations that are identical to or correspond to those in the above-described embodiment. The staircase portion 81 is formed so that the diameter thereof gradually decreases from the mounting-portion-21 side toward the bottom-wall-42 side. The staircase portion 81 includes a plurality of first wall portions 82 that have annular flat-plate-shapes and are perpendicular to the axial direction X1, and a plurality of second wall portions 83 that have tubular shapes and extend in parallel with the axial direction X1. The first wall portions 82 and the second wall portions 83 are provided alternately from the mounting-portion-21 side toward the bottom-wall-42 side. A step-like pleat portion 84 in which the diameter of the side wall 41A decreases slightly is formed by a first wall portion 82 and a second wall portion 83 that are adjacent to one another in the axial direction X1. In the example illustrated in FIG. 5, the staircase portion 81 is formed by four pleat portions 84. The pleat portions 84 each have an annular shape encircling a center axis L21 of the side wall 41A.

In the above-described embodiment, the pleat portions 56 do not necessarily need to have an annular shape encircling the center axis L2. It is sufficient that the pleat portions 56 extend in a direction intersecting the center axis L2 when seen from a direction that is orthogonal to the axial direction of the side wall 41.

In the above-described embodiment, the side wall 41 includes four pleat portions 56. However, the number of pleat portions 56 in the side wall 41 is not limited to four. Furthermore, the side wall 41 does not necessarily have to include pleat portions 56.

The mounting portion 21 is not limited to having a circular outer shape when seen from the axial direction X1. For example, the mounting portion 21 may have an annular shape whose outer shape, when seen from the axial direction X1, has the shape of an oval, a rounded rectangle, a keyhole, a polygon, or the like.

The flange portion 23a is not limited to having an annular shape encircling the center axis L3, and may have an arcuate shape extending along the circumferential direction about the center axis L3. The flange portion 24a is not limited to having an annular shape encircling the center axis L4, and may have an arcuate shape extending along the circumferential direction about the center axis L4. Furthermore, the first insertion portion 23 may not include the flange portion 23a. The second insertion portion 24 may not include the flange portion 24a.

The insertion portions 23 and 24 are not limited to having the shape of a cylinder, and it is sufficient that the insertion portions 23 and 24 have a tubular shape. For example, the insertion portions 23 and 24 may have a tubular shape having the shape of an oval, a rounded rectangle, a polygon, or the like when seen from the axial directions of the insertion portions 23 and 24.

In the above-described embodiment, the vehicle body panel 11 was mentioned as one example of an object to which the grommet 20 is to be attached. However, as long as the object to which the grommet 20 is to be attached is a member that includes an insertion hole into which a wire harness is inserted, the object is not limited to the vehicle body panel 11.

As illustrated in FIG. 3, the grommet 20 may be formed as an integrated component.

The vehicle body panel 11 in the illustrated examples may be referred to as a panel surface that includes a through-hole.

The seal portion 31 in the illustrated examples may be referred to as an annular waterproof seal that is configured to come into waterproofing contact with the vehicle body panel 11, and the mounting portion 21 in the illustrated example may be referred to as an annular base.

The stress-absorbing portion 22 in the illustrated examples, which includes the side wall 41 and the bottom wall 42, may be referred to as a stress-absorbing dome of the grommet 20. The first tubular portion 51 in the illustrated examples may be referred to as a dome base end of the grommet 20. The bottom wall 42 in the illustrated examples may be referred to as a dome ceiling of the grommet 20. The bellows portion 53 in the illustrated examples may be referred to as a bellows-shaped intermediate portion of the stress-absorbing portion 22 (stress-absorbing dome) of the grommet 20. The staircase portion 81 in FIG. 5 may be referred to as a step-shaped intermediate portion of the stress-absorbing portion 22 (stress-absorbing dome) of the grommet 20. The side walls 41 and 41A in the illustrated examples may be referred to as a radially outermost dome wall of the grommet 20. The tubular first insertion portion 23 and the tubular second insertion portion 24 in the illustrated examples may be referred to as one or more linear sleeves or radially inner tubes that extend radially inward of the stress-absorbing portion 22 (stress-absorbing dome) of the grommet 20 along the center axis L2 from the bottom wall 42 (dome ceiling) toward the mounting portion 21 (annular base), and that include a first opening end that is continuous with the bottom wall 42 (dome ceiling) and a second opening end (flange portion 23a or 24a) that is a free end. In the examples illustrated in FIGS. 1, 3, and 5, the inner surface of the bottom wall 42 (dome ceiling) and the radially outer surface of each of the tubular first insertion portion 23 and the tubular second insertion portion 24 may be connected to one another so that a corner portion with a predetermined angle is formed therebetween. The axial length of the tubular first insertion portion 23 and the tubular second insertion portion 24 may be less than the protruding height of the stress-absorbing portion 22 (stress-absorbing dome) of the grommet 20. For example, the tubular first insertion portion 23 and the tubular second insertion portion 24 may each include the free end (flange portion 23a or 24a) at a predetermined intermediate height position between the bottom wall 42 (dome ceiling) and the mounting portion 21 (annular base). The free end (flange portion 23a or 24a) of each of the tubular first insertion portion 23 and the tubular second insertion portion 24 need not be in contact with the radially inner surface of the stress-absorbing portion 22 (stress-absorbing dome) of the grommet 20.

Accordingly, the grommet (20) according to one aspect of the present disclosure may include:

an annular base (21) that includes an annular waterproof seal (31) that is configured to come into waterproofing contact with a panel surface (11) that includes an insertion hole (12);

a stress-absorbing dome (41, 41A) that protrudes by a dome height from the annular base (21), the stress-absorbing dome (41, 41A) including a dome base end (51) that is continuous from the annular base (21), a dome ceiling (42), and a center axis (L2); and one or more linear sleeves (23, 24) that allow wire harnesses (13, 14) to extend through the dome ceiling (42) of the stress-absorbing dome (41, 41A), the one or more linear sleeves (23, 24) extending radially inward of the stress-absorbing dome (41, 41A) along the center axis (L2) of the stress-absorbing dome (41, 41A) from the dome ceiling (42) of the stress-absorbing dome (41, 41A) toward the annular base (21).

Technical concepts that can be understood from the above-described embodiment and modifications will be described.

(a) In the grommet, the outer shape of the end portion of the stress-absorbing portion that is located on the bottom-wall side is smaller than the outer shape of the end portion of the stress-absorbing portion that is located on the opening side of the stress-absorbing portion.

According to this configuration, the size of the stress-absorbing portion in a direction that is orthogonal to the center axis of the side wall can be reduced near the bottom wall. Moreover, the size of the grommet in the direction that is orthogonal to the center axis of the side wall can be reduced.

(b) In the grommet, a plurality of the insertion portions are provided.

According to this configuration, if the grommet is provided with a plurality of insertion portions, the portions between the mounting portion and the insertion portions when seen from the axial directions of the insertion portions tend to become narrower. Even in such a case, a decrease in the waterproofing performance of the grommet can be suppressed while suppressing an increase in the size of the grommet in a direction that is orthogonal to the axial direction of the mounting portion.

(c) In the grommet, the mounting portion faces the surrounding portion of the insertion hole of the object to which the grommet is to be attached, and is sandwiched between the object and a bracket that is to be fixed to the object.

According to this configuration, in regard to a grommet that is to be attached to an object using a bracket, a decrease in the waterproofing performance of the grommet can be suppressed while suppressing an increase in the size of the grommet.

LIST OF REFERENCE NUMERALS

11 Vehicle body panel (object to which grommet is to be attached)
12 Insertion hole
13 Wire harness
14 Wire harness
20 Grommet
20A Grommet
21 Mounting portion
22 Stress-absorbing portion
22A Stress-absorbing portion
23 First insertion portion (insertion portion)
23a Flange portion
24 Second insertion portion (insertion portion)
24a Flange portion
31 Seal portion
32 First lip portion
33 Second lip portion
41 Side wall
41A Side wall
42 Bottom wall
42a Outer surface
51 First tubular portion
52 Second tubular portion
53 Bellows portion
54 First wall portion
54a to 54d First wall portion
55 Second wall portion
55a to 55d Second wall portion
56 Pleat portion
56a to 56d Pleat portion
61 Fixing member
62 Fixing member
71 Bracket
72 Sandwiching portion
73 Fixing portion
74 Fixing hole
75 Bolt
76 Nut
81 Staircase portion
82 First wall portion
83 Second wall portion
84 Pleat portion
L1 Center axis (center axis of mounting portion)
L2 Center axis (center axis of side wall)
L3 Center axis (center axis of insertion portion)
L4 Center axis (center axis of insertion portion)
L21 Center axis (center axis of side wall)
X1 Axial direction

What is claimed is:

1. A grommet comprising:
an annular mounting portion fixed to a surrounding portion of an insertion hole of an object to which the grommet is attached and which includes the insertion hole;
a tubular stress-absorbing portion including a tubular side wall that extends from an inner circumferential rim portion of the mounting portion toward one side in an axial direction of the mounting portion, and a bottom wall that partially closes off the tubular side wall at a front end of the tubular side wall; and
a tubular insertion portion provided integrally with the bottom wall of the tubular stress-absorbing portion, and configured to come into contact with an outer circumferential surface of a wire harness inserted into the insertion hole of the object and cover an outer circumference of the wire harness,
wherein the mounting portion includes an annular seal portion that comes into close contact with the surrounding portion of the insertion hole of the object to which the grommet is attached, or with an inner circumferential surface of the insertion hole,
the side wall is flexible, and
the insertion portion protrudes inside the stress-absorbing portion from the bottom wall toward a side of a base end of the side wall such that the side wall covers the insertion portion in its entirety.

2. The grommet according to claim 1,
wherein the insertion portion has a portion that overlaps the side wall of the tubular stress-absorbing portion in a direction that is orthogonal to a central axis of the insertion portion in a cross-section taken along a plane including the central axis of the insertion portion.

3. The grommet according to claim 1,
wherein the side wall includes a plurality of pleat portions that extend along a direction that intersects a central axis of the side wall when viewed from a direction that is orthogonal to an axial direction of the side wall, and
the plurality of pleat portions are displaced from one another in the axial direction of the side wall.

4. The grommet according to claim 3,
wherein the pleat portions each has an annular shape surrounding the central axis of the side wall, and
the plurality of pleat portions are arranged from a side of the annular mounting portion toward a side of the bottom wall and form a bellows portion in which adjacent ones of the pleat portions are continuously connected.

5. The grommet according to claim 1,
wherein an insertion portion of its entirety is positioned closer to the mounting portion than an outer surface of the bottom wall is in the axial direction of the mounting portion.

6. The grommet according to claim 1, wherein the side wall includes:
a first tubular portion extending along the axial direction of the mounting portion;
a second tubular portion positioned on an opposite side of the first tubular portion in the axial direction of the mounting portion; and
a bellows portion provided to so as to connect the first tubular portion and the second tubular portion.

* * * * *